United States Patent
Urakami

(10) Patent No.: US 10,142,552 B2
(45) Date of Patent: Nov. 27, 2018

(54) IMAGE PROCESSING APPARATUS THAT CORRECTS CONTOUR, CONTROL METHOD THEREFOR, STORAGE MEDIUM STORING CONTROL PROGRAM THEREFOR, AND IMAGE PICKUP APPARATUS

(71) Applicant: CANON KABUSHIKI KAISHA, Tokyo (JP)

(72) Inventor: Hiroyuki Urakami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/135,644

(22) Filed: Apr. 22, 2016

(65) Prior Publication Data

US 2016/0316125 A1 Oct. 27, 2016

(30) Foreign Application Priority Data

Apr. 24, 2015 (JP) .................................. 2015-089261

(51) Int. Cl.
| | | |
|---|---|---|
| *H04N 9/68* | (2006.01) | |
| *H04N 5/228* | (2006.01) | |
| *H04N 5/235* | (2006.01) | |
| *G06T 5/40* | (2006.01) | |
| *G06T 5/00* | (2006.01) | |

(52) U.S. Cl.
CPC .......... *H04N 5/2352* (2013.01); *G06T 5/009* (2013.01); *G06T 5/40* (2013.01); *H04N 5/2351* (2013.01); *G06T 2207/10024* (2013.01)

(58) Field of Classification Search
CPC ...... H04N 5/2351; H04N 5/2352; G06T 5/40; G06T 5/009; G06T 2207/10024
See application file for complete search history.

(56) References Cited

U.S. PATENT DOCUMENTS

| | | | |
|---|---|---|---|
| 6,148,116 A * | 11/2000 | Park ...................... | H04N 5/208 348/606 |
| 2005/0140829 A1* | 6/2005 | Uchida .................. | H04N 5/142 348/625 |
| 2005/0264684 A1* | 12/2005 | Kamon ................ | H04N 5/2351 348/362 |

(Continued)

FOREIGN PATENT DOCUMENTS

| | | |
|---|---|---|
| JP | 2007228451 A | 9/2007 |
| JP | 2008103979 A | 5/2008 |

*Primary Examiner* — Lin Ye
*Assistant Examiner* — John H Morehead, III
(74) *Attorney, Agent, or Firm* — Rossi, Kimms & McDowell LLP

(57) ABSTRACT

An image processing apparatus that is capable of applying suitable contour correction even to an object in a luminance range where gradation is corrected. A gradation correction unit performs a gradation correction process to an image obtained as a result of photographing. A contour correction unit performs a contour correction process that corrects a contour of an object in the image. A detection unit detects a luminance range where the gradation correction unit performs the gradation correction process in the image. A suppression unit suppresses the contour correction process in the luminance range that is detected by the detection unit when the contour correction unit performs the contour correction process.

24 Claims, 8 Drawing Sheets

(56) References Cited

U.S. PATENT DOCUMENTS

| | | | |
|---|---|---|---|
| 2006/0001748 A1* | 1/2006 | Kamon | H04N 5/35509 348/234 |
| 2009/0052798 A1* | 2/2009 | Kwon | H04N 5/357 382/264 |
| 2010/0201862 A1* | 8/2010 | Hatabu | H04N 5/3535 348/311 |
| 2012/0113307 A1* | 5/2012 | Watanabe | H04N 5/23219 348/333.01 |
| 2013/0121576 A1* | 5/2013 | Hsu | G06T 5/40 382/167 |
| 2014/0028879 A1* | 1/2014 | Morino | G06T 5/007 348/241 |
| 2014/0232907 A1* | 8/2014 | Endo | H04N 5/23232 348/240.1 |
| 2015/0103250 A1* | 4/2015 | Watanabe | H04N 5/21 348/576 |
| 2015/0208051 A1* | 7/2015 | Sugimoto | H04N 9/646 348/223.1 |
| 2016/0366422 A1* | 12/2016 | Yin | H04N 19/117 |
| 2017/0061230 A1* | 3/2017 | Sato | A61B 1/04 |
| 2017/0140734 A1* | 5/2017 | Kageyama | G09G 5/10 |

\* cited by examiner

IMAGE PROCESSING APPARATUS THAT CORRECTS CONTOUR, CONTROL METHOD THEREFOR, STORAGE MEDIUM STORING CONTROL PROGRAM THEREFOR, AND IMAGE PICKUP APPARATUS

BACKGROUND OF THE INVENTION

Field of the Invention

The present invention relates to an image processing apparatus, a control method therefor, a storage medium storing a control program therefor, and an image pickup apparatus, and in particular, relates to a technique that detects a luminance range subjected to gradation correction and suppresses contour correction intensity to the luminance range concerned.

Description of the Related Art

In general, there is an image pickup apparatus, such as a digital camera, that corrects a contour of an object within an image about image data obtained as a result of photographing. FIG. 8 is a block diagram showing a configuration of a conventional image processing apparatus that corrects a contour.

The image processing apparatus shown in FIG. 8 has a luminance signal generation unit 801, a contour correction unit 802, and a gamma correction unit 803. The luminance signal generation unit 801 generates a luminance signal on the basis of R (red), G (green), and B (blue) signals that show image data.

The contour correction unit 802 receives a luminance signal output from the luminance signal generation unit 801 and generates a contour correction gain amount according to a luminance amount that the luminance signal shows. Then, the contour correction unit 802 modulates and corrects the luminance signal (i.e., corrects a contour) according to the contour correction gain amount concerned, and outputs the luminance signal corrected by the contour correction.

The gamma correction unit 803 applies gamma correction to the luminance signal that was modulated and corrected, and outputs a gamma-corrected luminance signal.

Such an image processing apparatus is disclosed in Japanese Laid-Open Patent Publication (Kokai) No. 2008-103979 (JP 2008-103979A), for example.

However, when the image processing apparatus shown in FIG. 8 and the image processing apparatus disclosed in JP 2008-103979A correct a contour corrected by gradation correction, such as dodge correction, about image data, the contour is corrected without considering the luminance range subjected to the dodge correction. As a result of this, the suitable contour correction cannot be applied to the luminance range to which the dodge correction was applied.

Furthermore, there is a known technique that corrects a contour on the basis of dodge correction that is an example of gradation correction in order to achieve both an enlarged dynamic range and high image quality. FIG. 9 is a block diagram showing a configuration of a conventional image processing apparatus that corrects a contour on the basis of such dodge correction.

The image processing apparatus shown in FIG. 9 is provided with a dodge correction unit 901 in addition to the configuration in FIG. 8. The dodge correction unit 901 applies the dodge correction to the luminance signal output from the luminance signal generation unit 801. In this case, the dodge correction unit 901 gives a contour correction parameter generated according to a dodge parameter to the contour correction unit 802.

The gamma correction unit 803 applies the gamma correction to the luminance signal to which the dodge correction was applied, and sends the luminance signal corrected by the gamma correction to the contour correction unit 802. The contour correction unit 802 applies the contour correction to the luminance signal corrected by the gamma correction on the basis of the contour correction parameter, and outputs the luminance signal corrected by the contour correction.

Such an image pickup apparatus that determines the contour correction parameter on the basis of the dodge parameter used in the dodge correction and corrects the contour according to the contour correction parameter concerned is disclosed in Japanese Laid-Open Patent Publication (Kokai) No. 2007-228451 (JP 2007-228451A).

However, since the image processing apparatus shown in FIG. 9 and the image pickup apparatus disclosed in JP 2007-228451A generate the contour correction parameter on the basis of the dodge parameter, the contour correction will be uniformly applied to the entire image or each of divided areas. As a result, the suitable contour correction may not be applied to the luminance range to which the dodge correction was applied.

SUMMARY OF THE INVENTION

The present invention provide an image processing apparatus, a control method therefor, a storage medium storing a control program therefor, and an image pickup apparatus, which are capable of applying suitable contour correction even to an object in a luminance range where gradation is corrected.

Accordingly, a first aspect of the present invention provides an image processing apparatus comprising a gradation correction unit configured to perform a gradation correction process to an image obtained as a result of photographing, a contour correction unit configured to perform a contour correction process that corrects a contour of an object in the image, a detection unit configured to detect a luminance range where the gradation correction unit performs the gradation correction process in the image, and a suppression unit configured to suppress the contour correction process in the luminance range that is detected by the detection unit when the contour correction unit performs the contour correction process.

Accordingly, a second aspect of the present invention provides an image pickup apparatus comprising an image pickup unit configured to photograph an object to obtain an image, a gradation correction unit configured to perform a gradation correction process to the image obtained by the image pickup unit, a contour correction unit configured to perform a contour correction process that corrects a contour of an object in the image, a detection unit configured to detect a luminance range where the gradation correction unit performs the gradation correction process in the image, and a suppression unit configured to suppress the contour correction process in the luminance range that is detected by the detection unit when the contour correction unit performs the contour correction process.

Accordingly, a third aspect of the present invention provides a control method for an image processing apparatus, the control method comprising a gradation correction step of performing a gradation correction process to an image obtained as a result of photographing, a contour correction step of performing a contour correction process that corrects a contour of an object in the image, a detection step of detecting a luminance range where the gradation correction process is performed in the gradation correction step in the image, and a suppression step of suppressing the contour correction process in the luminance range that is detected in the detection step when the contour correction process is performed in the contour correction step.

Accordingly, a fourth aspect of the present invention provides a non-transitory computer-readable storage medium storing a control program causing a computer to execute the control method of the third aspect.

According to the present invention, the range in which the gradation correction process is applied is detected when the gradation correction process is performed, and the contour correction to the object is suppressed in the detected range when the contour correction process is performed. As a result of this, the contour is suitably corrected even in the luminance range where the gradation is corrected.

Further features of the present invention will become apparent from the following description of exemplary embodiments with reference to the attached drawings.

DESCRIPTION OF THE EMBODIMENTS

Hereafter, an example of an image processing apparatus according to an embodiment of the present invention will be described with reference to the attached drawings.

Figure 1:
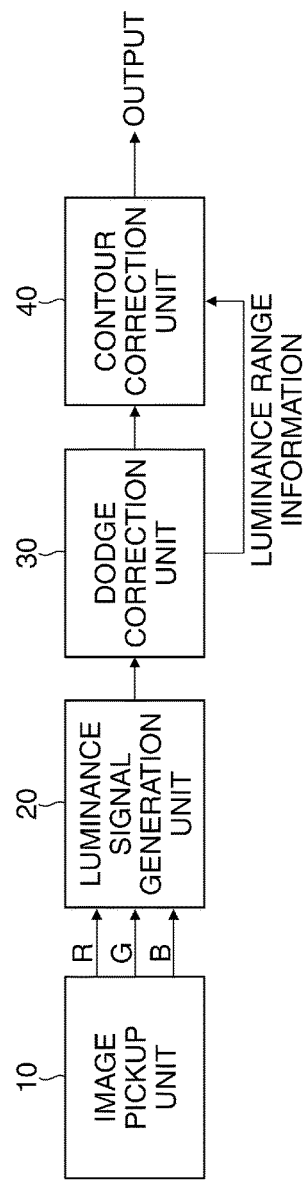
FIG. 1 is a block diagram schematically showing a configuration of an example of an image pickup apparatus (a camera) equipped with an image processing apparatus according to a first embodiment of the present invention.

FIG. 1 is a block diagram schematically showing a configuration of an example of an image pickup apparatus equipped with an image processing apparatus according to a first embodiment of the present invention.

The illustrated image pickup apparatus is a digital camera (hereinafter referred to as a camera, simply) that has an image pickup unit 10. The image pickup unit 10 has a photographing lens unit (hereinafter referred to as a photographing lens), an image pickup device, such as a CCD or a CMOS sensor, and a control unit, which are not shown. An optical image (object image) is formed on the image pickup device through the photographing lens. Then, the image pickup device outputs an analog signal corresponding to the optical image.

The control unit controls exposure, shutter speed, etc., A/D-converts the analog signal output from the image pickup device, and outputs RGB signals that represent image data. A luminance signal generation unit 20 receives the RGB signals, and generates a luminance signal on the basis of the RGB signals.

A dodge correction unit 30 performs a dodge correction process for increasing a luminance level in a low luminance range in which a luminance signal is low. Furthermore, the dodge correction unit 30 detects the range (luminance range) to which the dodge correction process was applied in the luminance signal, and sends the luminance range information that represents the luminance range concerned to a contour correction unit 40.

The contour correction unit 40 applies contour correction to the luminance signal output from the dodge correction unit 30. When the contour correction is applied to the luminance signal, the contour correction unit 40 suppresses a contour correction intensity in the luminance range to which the dodge correction process was applied that the luminance range information represents. In this case, the contour correction unit 40 performs a process that suppresses the contour correction to an object included in the luminance range where the dodge correction process was performed. Then, the contour correction unit 40 outputs the luminance signal (i.e., image data) corrected by the contour correction.

Figure 2:
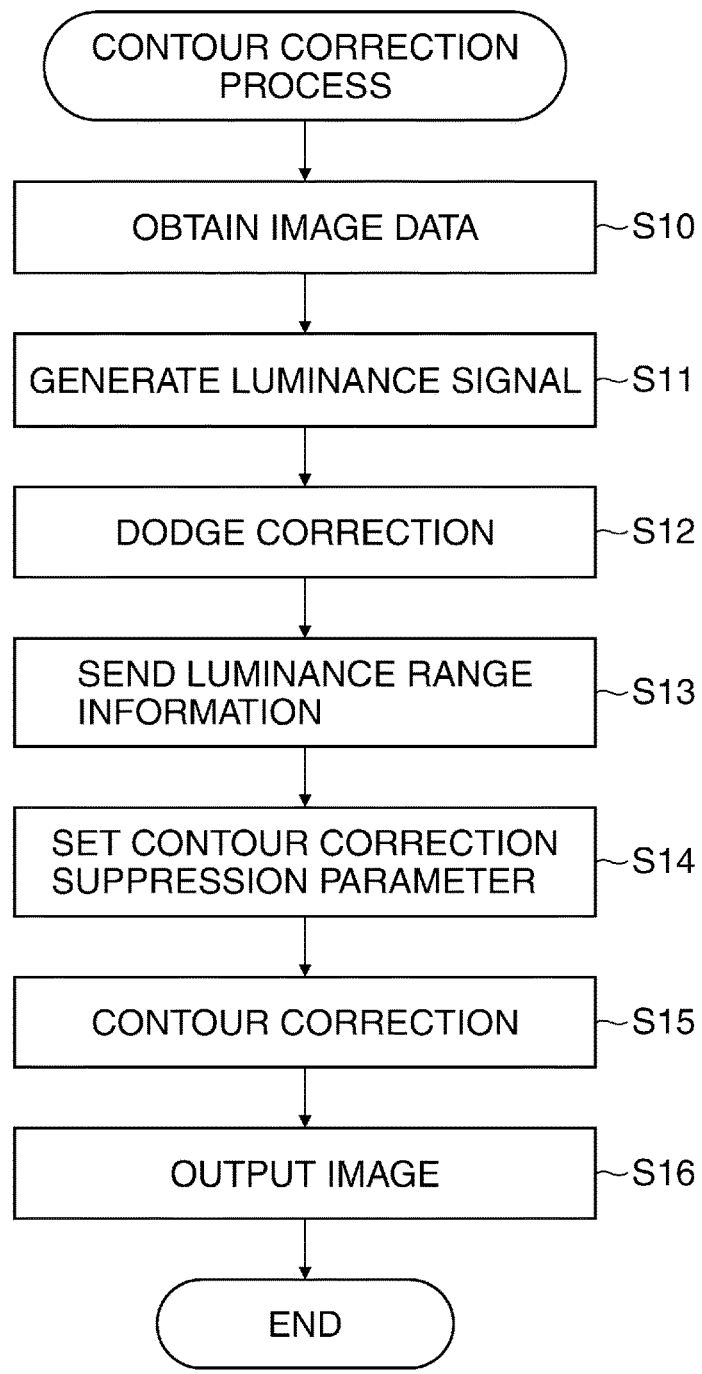
FIG. 2 is a flowchart showing a contour correction process performed by the camera shown in FIG. 1.

FIG. 2 is a flowchart showing the contour correction process performed by the camera shown in FIG. 1.

When the contour correction process is started, the luminance signal generation unit 20 obtains image data (RGB signals) from the image pickup unit 10 (step S10). Then, the luminance signal generation unit 20 generates a luminance signal from the RGB signals (step S11). Subsequently, the dodge correction unit 30 performs the dodge correction process for increasing a luminance level in a low luminance range where a luminance signal is less than a predetermined luminance value to a predetermined luminance level in the luminance signal output from the luminance signal generation unit 20, and sends the luminance signal corrected by the dodge correction process to the contour correction unit 40 (step S12).

Next, the dodge correction unit 30 detects the luminance range where the dodge correction process was performed, and sends the luminance range information that represents the luminance range concerned to the contour correction unit 40 (step S13). The contour correction unit 40 sets up contour correction suppression parameters according to the luminance range information (step S14).

The contour correction suppression parameters include a first parameter and a second parameter. The first parameter (intensity suppression parameter) represents the luminance range where the intensity of the contour correction is suppressed (i.e., luminance range information). Moreover, the second parameter represents a suppressed level for controlling the intensity of contour correction. How to determine the first and a second parameters will be mentioned later.

The contour correction unit 40 performs the contour correction process while suppressing a contour correction gain on the basis of the above-mentioned contour correction suppression parameters (step S15). Then, the contour correction unit 40 outputs the luminance signal corrected by the contour correction as an image (step S16), and finishes the contour correction process.

Figure 3A:
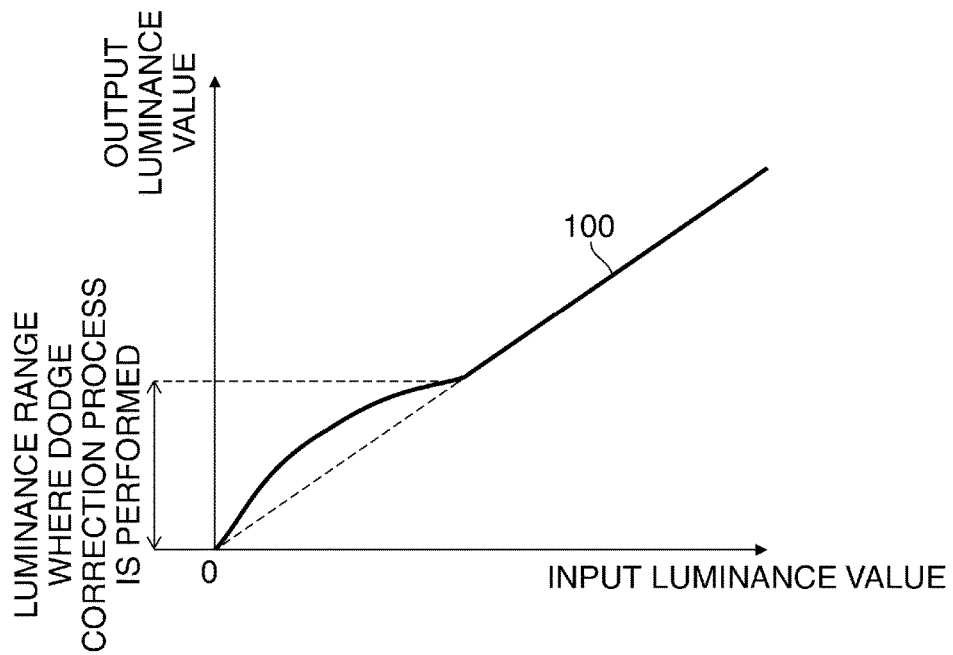
FIG. 3A and FIG. 3B are graphs for describing a relationship between a dodge correction process and a contour correction process that are performed by the camera shown in FIG. 1.
Figure 3B:
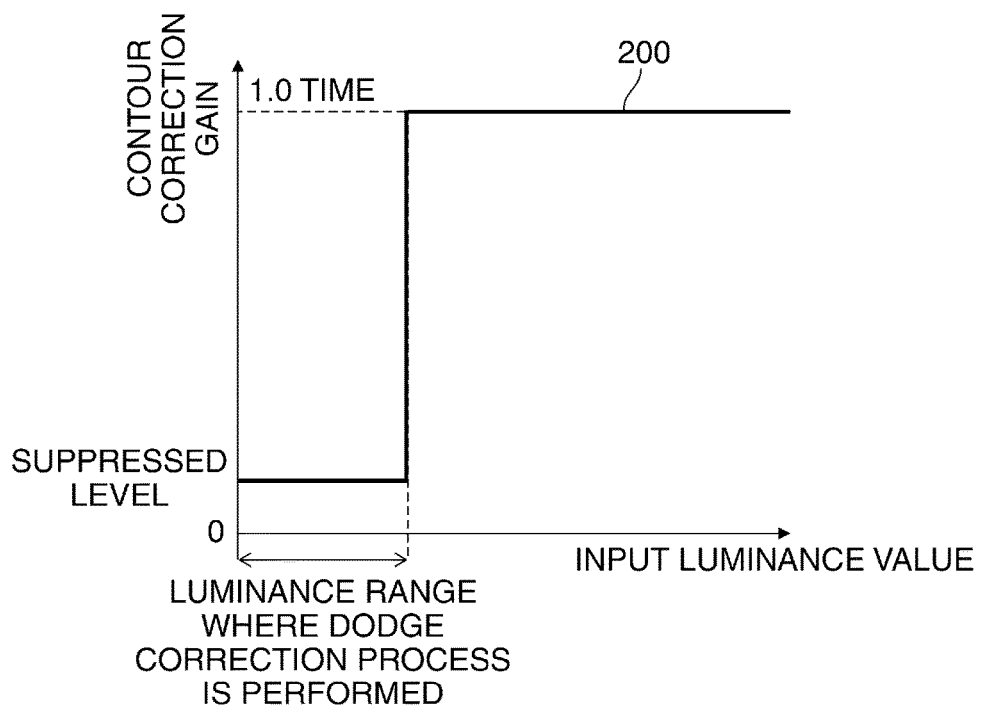

FIG. 3A and FIG. 3B are graphs for describing a relationship between the dodge correction process and the contour correction process that are performed by the camera shown in FIG. 1.

In FIG. 3A, a horizontal axis indicates the luminance value (input luminance value) of the luminance signal input into the dodge correction unit 30, and a vertical axis indicates the luminance value (output luminance value) of the luminance signal output from the dodge correction unit 30. The dodge correction unit 30 performs the dodge correction process according to a preset input-output characteristic 100 of the dodge correction. The illustrated input-output characteristic 100 is stored in a table in the dodge correction unit 30, for example. At this time, the input-output characteristic 100 may be generated by recording only representative points in the table and by performing an interpolation process between the representative points by the dodge correction unit 30.

In the illustrated input-output characteristic 100, the relation between the input luminance value and the output luminance value is linear in a range where the input luminance value exceeds a predetermined luminance value. On the other hand, the relation draws a curve so that the luminance level of the output luminance value rises up with respect to the input luminance value in a range where the input luminance is less than the predetermined luminance value. That is, the dodge correction unit 30 will perform the dodge correction process for the luminance range where the luminance level of the input luminance value is less than the predetermined luminance level.

As mentioned above, the dodge correction unit 30 detects the luminance range where the dodge correction process was performed, and sends the luminance range information that represents the luminance range concerned to the contour correction unit 40. In this case, the dodge correction unit 30 detects the luminance range where the dodge correction process was performed with reference to the input-output characteristic 100. Then, the dodge correction unit 30 sends the luminance range information that represents the luminance range where the dodge correction process was performed to the contour correction unit 40.

In FIG. 3B, a horizontal axis represents the luminance value (input luminance value) of the luminance signal input into the contour correction unit 40, and a vertical axis represents the contour correction gain. The illustrated contour correction characteristic 200 defines the relation between the input luminance value and the contour correction gain. The contour correction gain in the luminance range where the dodge correction process was performed is set lower than the contour correction gain in the luminance range where the dodge correction process was not performed. That is, the contour correction gain in the luminance range where the dodge correction process was performed is set as a suppressed level.

The contour correction unit 40 uses the luminance range information as an intensity suppression parameter used for the contour correction process. The contour correction unit 40 sets up the luminance range where the contour correction intensity is suppressed in the horizontal axis in FIG. 3B on the basis of the luminance range information. Then, the contour correction unit 40 determines the contour correction characteristic 200 by using the contour correction gain in the luminance range concerned as the suppressed level. After that, the contour correction unit 40 obtains the contour correction gain according to the input luminance value on the basis of the contour correction characteristic 200, and corrects the contour using the contour correction gain concerned.

In the illustrated example, the contour correction gain in the luminance range where the dodge correction process is performed is set to the suppressed level that is obtained by multiplying a predetermined ratio to the contour correction gain in the other luminance range.

It should be noted that the suppressed level in the luminance range that is represented by the luminance range information (i.e., in the luminance range where the contour correction intensity is suppressed) is determined according to the standard established beforehand. For example, the suppressed level is determined on the basis of a width (i.e., an area) of the luminance range where the dodge correction process was performed. When the width of the luminance range where the dodge correction process was performed is narrower than a predetermined width, the width of the luminance range that is corrected by the dodge correction process is also narrow. In such a case, the above-mentioned predetermined ratio is enlarged and the suppressed level rises. This prevents excessive suppression of the contour correction.

On the other hand, when the width of the luminance range where the dodge correction process was performed is wider than the predetermined width, the width of the luminance range that is corrected by the dodge correction process is also wide. In such a case, the predetermined ratio is reduced and the suppressed level is lowered. This prevents emphasis of a noise in the luminance range.

Thus, in the first embodiment of the present invention, the contour correction unit 40 determines the contour correction characteristic as mentioned above and suppresses the contour correction process on the basis of the contour correction characteristic by controlling the contour correction gain used in the contour correction process. As a result of this, the contour is suitably corrected even in the luminance range where the dodge correction is applied.

Figure 4:
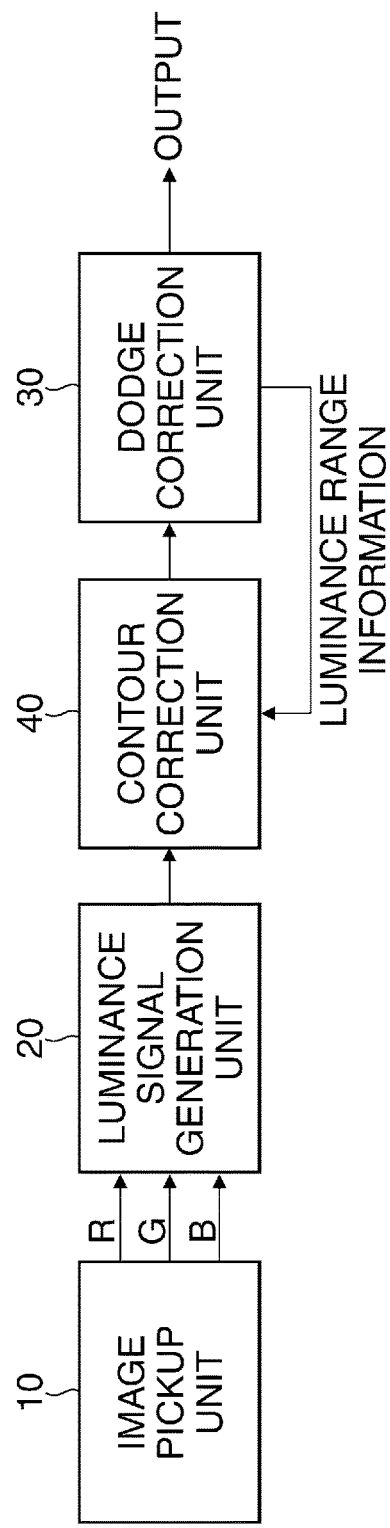
FIG. 4 is a block diagram schematically showing a configuration of another example of a camera equipped with an image processing apparatus according to the first embodiment of the present invention.

FIG. 4 is a block diagram schematically showing a configuration of another example of a camera equipped with the image processing apparatus according to the first embodiment of the present invention.

The camera shown in FIG. 4 is different from the camera shown in FIG. 1 in that the contour correction unit 40 is arranged at the preceding stage of the dodge correction unit 30. In the camera shown in FIG. 4, the contour correction unit 40 performs the contour correction process first, and then, the dodge correction unit 30 performs the dodge correction process. After performing the dodge correction process, the dodge correction unit 30 feeds back the luminance range information that represents the luminance range where the dodge correction process was performed to the contour correction unit 40. As a result of this, the contour correction unit 40 suppresses the contour correction process to the next input luminance signal (i.e., image data).

Next, one example of a camera according to a second embodiment of the present invention will be described.

The configuration of the camera of the second embodiment is the same as the camera shown in FIG. 1. Moreover, the camera according to the second embodiment performs the contour correction process according to the flowchart shown in FIG. 2. It should be noted that the camera according to the second embodiment may arrange the contour correction unit 40 at the preceding stage of the dodge correction unit 30 as shown in FIG. 4.

Figure 5A:
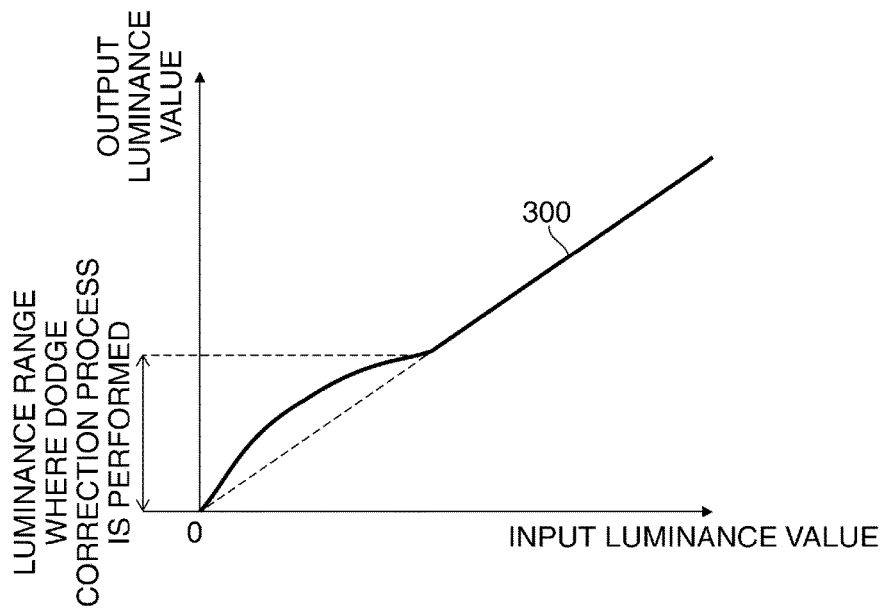
FIG. 5A and FIG. 5B are graphs for describing a relationship between a dodge correction process and a contour correction process that are performed by a camera equipped with an image processing apparatus according to a second embodiment of the present invention.
Figure 5B:
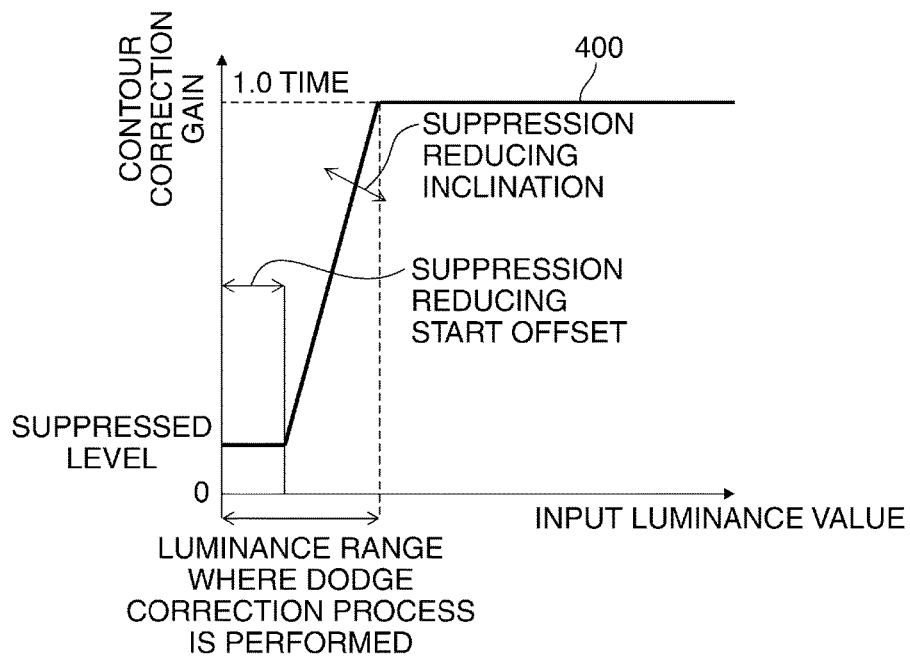

FIG. 5A and FIG. 5B are graphs for describing a relationship between the dodge correction process and the contour correction process that are performed by the camera equipped with an image processing apparatus according to the second embodiment of the present invention.

The camera according to the second embodiment sets up first, second, third, and fourth parameters as the contour correction suppression parameters set up in the process in the step S14 shown in FIG. 2. The first and second parameters are the same as the first and second parameters described in the first embodiment. The third parameter indicates a luminance value from which reduction (gradual increase, in this case) of the intensity suppression concerning the contour correction starts. The third parameter is called a suppression reducing start offset. The fourth parameter indicates a reduction degree of the intensity suppression according to the luminance value at the time of reducing the intensity suppression of the contour correction. The fourth parameter is called a suppression reducing inclination.

In FIG. 5A, a horizontal axis indicates the luminance value (input luminance value) of the luminance signal input into the dodge correction unit 30, and a vertical axis indicates the luminance value (output luminance value) of the luminance signal output from the dodge correction unit 30. The dodge correction unit 30 performs the dodge correction process according to a preset input-output characteristic 300 of the dodge correction. The illustrated input-output characteristic 300 is stored in a table in the dodge correction unit 30, for example.

In the illustrated input-output characteristic 300, the relation between the input luminance value and the output luminance value is linear in a range where the input luminance value exceeds a predetermined luminance value. On the other hand, the relation draws a curve so that the luminance level of the output luminance value rises up with respect to the input luminance value in a range where the input luminance is less than the predetermined luminance value. That is, the dodge correction unit 30 will perform the dodge correction process for the luminance range where the luminance level of the input luminance value is less than the predetermined luminance level.

As mentioned above, the dodge correction unit 30 detects the luminance range where the dodge correction process was performed, and sends the luminance range information that represents the luminance range concerned to the contour correction unit 40. In this case, the dodge correction unit 30 detects the luminance range where the dodge correction process was performed with reference to the input-output characteristic 300. Then, the dodge correction unit 30 sends the luminance range information that represents the luminance range where the dodge correction process was performed to the contour correction unit 40.

In FIG. 5B, a horizontal axis represents the luminance value (input luminance value) of the luminance signal input into the contour correction unit 40, and a vertical axis represents the contour correction gain. The illustrated contour correction characteristic 400 defines the relation between the input luminance value and the contour correction gain. The contour correction gain in the luminance range where the dodge correction process was performed is set lower than the contour correction gain in the luminance range where the dodge correction process was not performed (i.e., the luminance range other than the luminance range where the dodge correction process is performed).

The contour correction unit 40 uses the luminance range information as an intensity suppression parameter (the first parameter) used for the contour correction process. The contour correction unit 40 sets up the luminance range where the contour correction intensity is suppressed in the horizontal axis in FIG. 5B on the basis of the luminance range information. Furthermore, the contour correction unit 40 determines the suppressed level, the suppression reducing start offset, and the suppression reducing inclination according to preset standards.

In the illustrated example, the contour correction gain in the luminance range where the dodge correction process was performed is set to the suppressed level that is obtained by multiplying a predetermined ratio to the contour correction gain in the other luminance range.

For example, the suppressed level, the suppression reducing start offset, and the suppression reducing inclination are determined on the basis of the width of the luminance range where the dodge correction process was performed. When the width of the luminance range where the dodge correction process was performed is narrower than a predetermined width, the above-mentioned predetermined ratio is enlarged and the suppressed level rises.

When the width of the luminance range where the dodge correction process was performed is narrower than the predetermined width, the suppression reducing inclination is set gently. At this time, the input luminance value at the intersection of the suppressed level and the straight line having the suppression reducing inclination is set up as the suppression reducing start offset.

On the other hand, when the width of the luminance range where the dodge correction process was performed is wider than the predetermined width (i.e., when the width of the luminance range is wider), the predetermined ratio is reduced and the suppressed level is lowered in order to prevent emphasis of a noise in the luminance range. Furthermore, when the width of the luminance range where the dodge correction process was performed is more than the predetermined width, the suppression reducing inclination is set up steeply. Also at this time, the input luminance value at the intersection of the suppressed level and the straight line having the suppression reducing inclination is set up as the suppression reducing start offset.

The contour correction unit 40 sets up the suppressed level in the luminance range where the dodge correction process was performed, the suppression reducing start offset, and the suppression reducing inclination as mentioned above, and determines the contour correction characteristic 400. After that, the contour correction unit 40 obtains the contour correction gain corresponding to the input luminance value on the basis of the contour correction characteristic 400, and corrects the contour using the contour correction gain concerned.

Thus, in the second embodiment of the present invention, the contour correction unit 40 determines the contour correction characteristic as mentioned above and suppresses the contour correction process on the basis of the contour correction characteristic by controlling the contour correction gain used in the contour correction process. As a result of this, the contour is suitably corrected even in the luminance range where the dodge correction is applied.

Next, one example of a camera according to a third embodiment of the present invention will be described.

Figure 6:
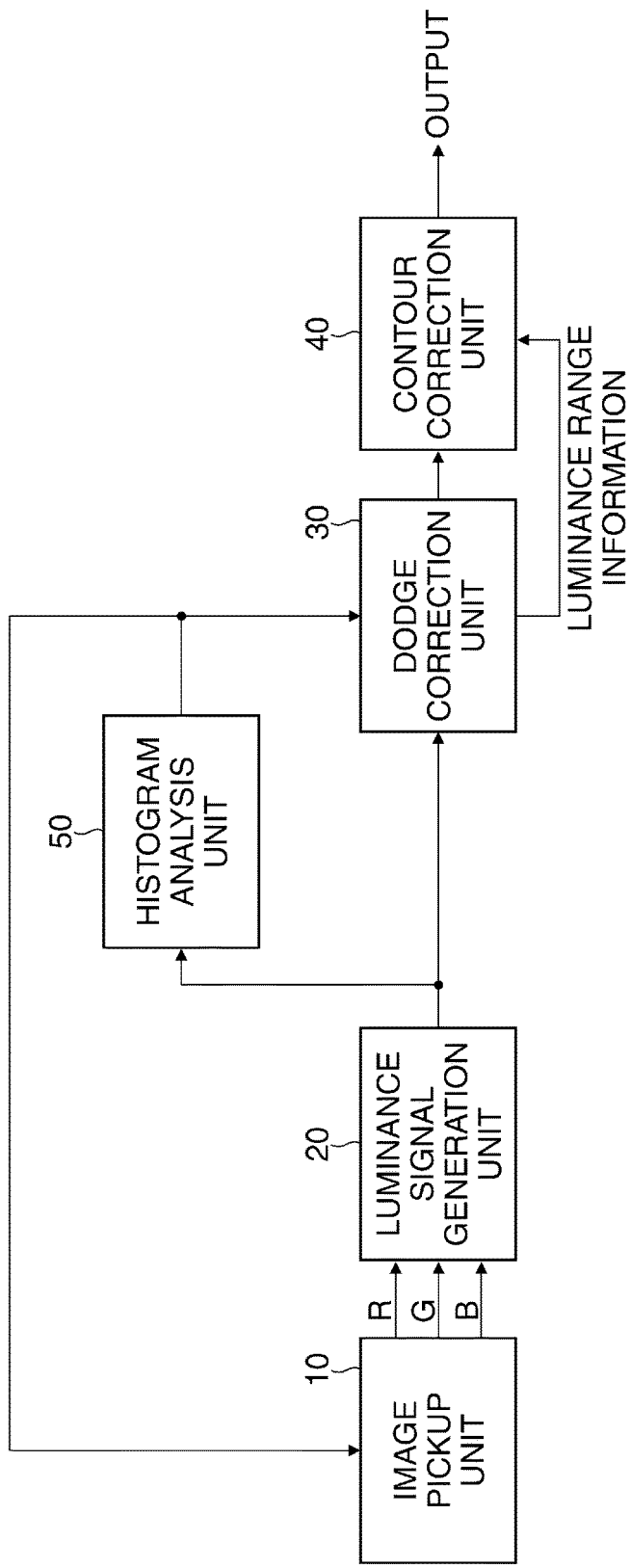
FIG. 6 is a block diagram schematically showing a configuration of an example of a camera according to a third embodiment of the present invention.

FIG. 6 is a block diagram schematically showing a configuration of the example of the camera according to the third embodiment of the present invention. It should be noted that components of the camera in FIG. 6 that are the same as the components of the camera in FIG. 1 are indicated by the same reference numbers and the descriptions thereof are omitted.

The camera in FIG. 6 is provided with a histogram analysis unit 50. The luminance signal output from the luminance signal generation unit 20 is given to the histogram analysis unit 50. The histogram analysis unit 50 obtains a histogram on the basis of the luminance values of the luminance signals in the luminance ranges. A horizontal axis and a vertical axis of the histogram respectively indicate a luminance value and a frequency. Then, the histogram analysis unit 50 analyzes the luminance signal (i.e., image data) on the basis of the histogram, and obtains an analysis result of luminance distribution.

For example, the histogram analysis unit 50 finds a ratio (low-luminance ratio) of a low luminance area in which luminance is less than a predetermined first luminance threshold in the image data. Then, the histogram analysis unit 50 finds the maximum-frequency luminance value that is a luminance value of which frequency is maximum in the low luminance area concerned. Furthermore, the histogram analysis unit 50 finds a ratio (high-luminance ratio) of a high-luminance area in which luminance is more than a predetermined second luminance threshold in the image data. Then, the histogram analysis unit 50 computes a ratio (low-high ratio) of the low-luminance ratio and the high-luminance ratio. After that, the histogram analysis unit 50 computes an evaluation value that shows whether the image inclines toward the low-luminance side or the image inclines toward the high-luminance side on the basis of the low-high ratio. It should be noted that the second luminance threshold is equal to or more than the first luminance threshold.

The above-mentioned evaluation value is sent to the image pickup unit 10, and the image pickup unit 10 performs photograph control according to the evaluation value concerned. For example, when the evaluation value shows that the image inclines toward the low-luminance side (i.e., the image is dark), the image pickup unit 10 controls to be over-exposure and obtains proper brightness. On the other hand, when the evaluation value shows that the image inclines toward the high-luminance side (i.e., the image is bright), the image pickup unit 10 controls to be under-exposure and obtains proper brightness.

As described with reference to FIG. 1, the dodge correction unit 30 performs the dodge correction process for increasing a luminance level in a low luminance range in which a luminance signal is low. Furthermore, the dodge correction unit 30 detects the range (luminance range) to which the dodge correction process was applied in the luminance signal, and sends the luminance range information that represents the luminance range concerned to a contour correction unit 40.

The histogram analysis unit 50 gives the analysis result of the histogram to the dodge correction unit 30. The dodge correction unit 30 determines the dodge correction intensity used in the dodge correction process on the basis of the analysis result (the low-luminance ratio, in this case). For example, the dodge correction unit 30 increases the dodge correction intensity when the low-luminance ratio in the analysis result is equal to or more than a predetermined ratio threshold (when the low-luminance ratio is high). On the other hand, the dodge correction unit 30 decreases the dodge correction intensity when the low-luminance ratio in the analysis result is less than the ratio threshold comparatively weakly (when a low-luminance rate is low). Then, the dodge correction unit 30 performs the dodge correction according to the dodge correction intensity.

As described with reference to FIG. 1, the contour correction unit 40 suppresses the contour correction in the luminance range where the dodge correction process was performed when correcting the contour.

Figure 7:
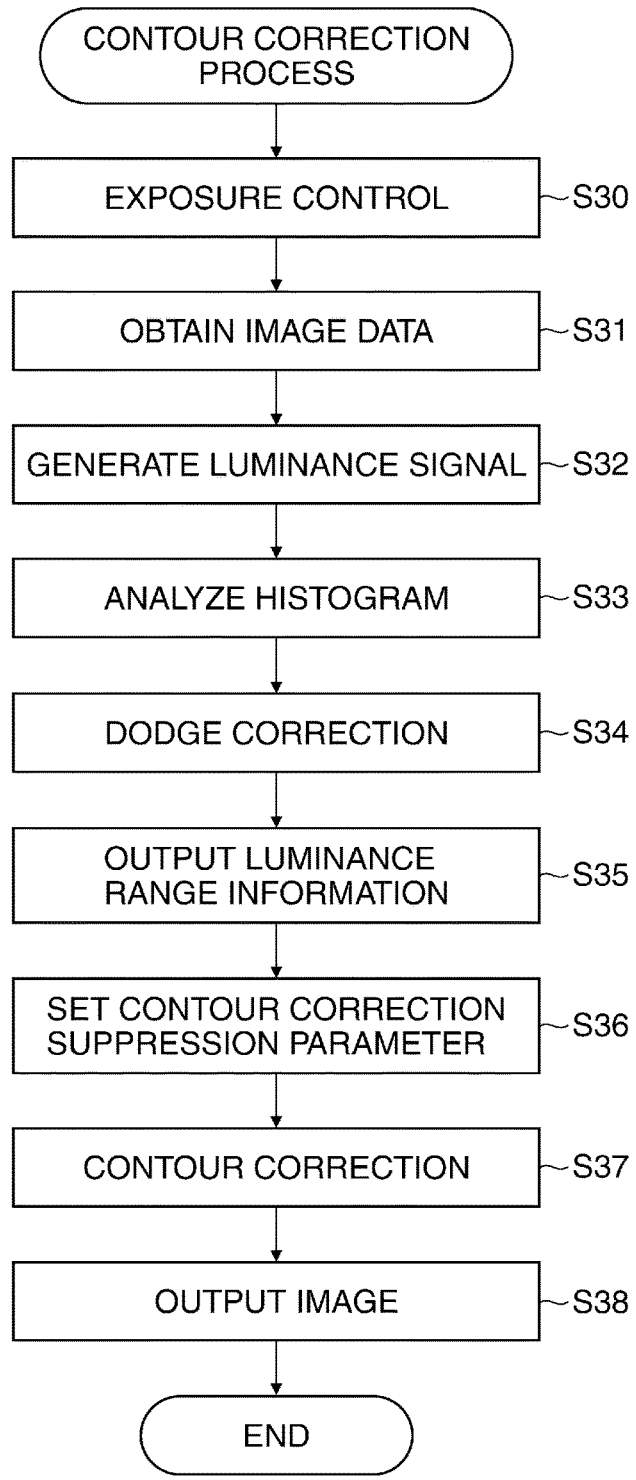
FIG. 7 is a flowchart showing a contour correction process performed by the camera shown in FIG. 6.
Figure 8:
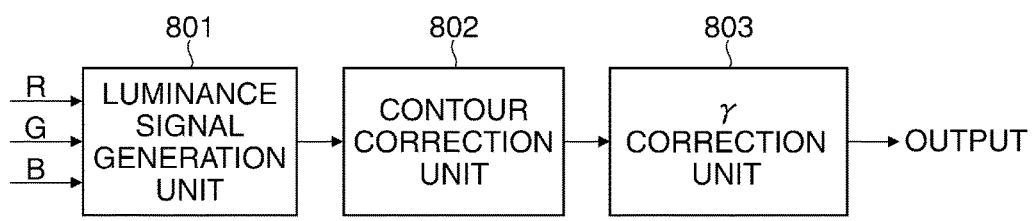
FIG. 8 is a block diagram schematically showing a configuration of an example of a conventional image processing apparatus.
Figure 9:
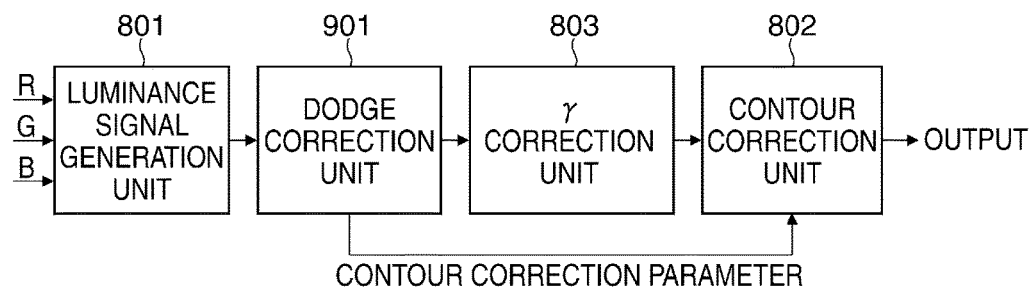
FIG. 9 is a block diagram schematically showing a configuration of another example of a conventional image processing apparatus.

FIG. 7 is a flowchart showing the contour correction process performed by the camera shown in FIG. 6. It should be noted that processes in steps S31 and S32 in FIG. 7 are the same as the processes in the steps S10 and S11 in FIG. 2.

When the contour correction process is started, the image pickup unit 10 performs an exposure control (it is also called a photograph control) on the basis of the evaluation value generated by the histogram analysis unit 50 according to the last image data. After that, the luminance signal generation unit 20 processes in the steps S31 and S32, and generates a luminance signal.

The histogram analysis unit 50 analyzes the luminance signal (i.e., image data) on the basis of the histogram as mentioned above, and obtains the analysis result (step S33). Then, the histogram analysis unit 50 sends the evaluation value to the image pickup unit 10. Then, the image pickup unit 10 performs the exposure control on the basis of the evaluation value concerned. Furthermore, the histogram analysis unit 50 sends the low-luminance ratio that is the analysis result to the dodge correction unit 30.

The dodge correction unit 30 determines the dodge correction intensity used in the dodge correction process on the basis of the analysis result concerned. Then, the dodge correction unit 30 performs the dodge correction process according to the dodge correction intensity (step S34). Furthermore, the dodge correction unit 30 detects the luminance range where the dodge correction process was performed, and outputs the luminance range information that represents the luminance range concerned to the contour correction unit 40 (step S35).

The contour correction unit 40 sets up the contour correction suppression parameters that indicates the luminance range in which the contour correction intensity is suppressed and the suppressed level that suppresses the contour correction intensity according to the luminance range information as mentioned above (step S36). At this time, the contour correction unit 40 may set up the suppression reducing start offset and the suppression reducing inclination as described in the second embodiment. Then, the contour correction unit 40 performs the contour correction process while suppressing the contour correction in the luminance range where the dodge correction process was performed as mentioned above (step S37). Then, the contour correction unit 40 outputs the luminance signal corrected by the contour correction as an image (step S38), and finishes the contour correction process.

It should be noted that the dodge correction unit 30 finds the luminance range to which the dodge correction process is applied according to the dodge correction intensity. That is, the dodge correction unit 30 treats the luminance range in which the dodge correction intensity is set up as the luminance range to which the dodge correction process is applied.

Thus, in the third embodiment of the present invention, the exposure control is performed and the dodge correction intensity is set up according to the analysis result by the histogram analysis unit 50. Then, the contour correction unit 40 determines the contour correction characteristic, and suppresses the contour correction process on the basis of the contour correction characteristic by controlling the contour correction gain used in the contour correction process. As a result of this, the contour is suitably corrected even in the luminance range where the dodge correction is applied.

As mentioned above, since the embodiments of the present invention enable to perform the suitable contour correction even in the luminance range where the dodge correction process was performed, the visibility in the luminance range where the dodge correction process was performed is improved without emphasizing a noise. Furthermore, since the excessive suppression of the contour correction is prevented in the luminance range where the dodge correction process was not performed, the image to which the suitable contour correction process is performed is obtained.

As is clear from the above description, in the example shown in FIG. 1 or FIG. 6, the dodge correction unit 30 functions as the detection unit and the determination unit, and the contour correction unit 40 functions as the suppression unit. The histogram analysis unit 50 functions as the analysis unit. Moreover, the image pickup unit 10 is provided with a control unit that controls the exposure at the time of obtaining an image. It should be noted that the luminance signal generation unit 20, the dodge correction unit 30, and the contour correction unit 40 constitute the image processing apparatus.

Although the three above-mentioned embodiments describe the example that performs the dodge correction process as the gradation correction process that raises the luminance level of the luminance signal in the low luminance range, another gradation correction process may be performed as long as the gradation correction process raises the luminance level of the luminance signal in the low luminance range.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by an image processing apparatus. Moreover, the functions of the above mentioned embodiments may be achieved as a control program that is executed by a computer with which the image processing apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-089261, filed Apr. 24, 2015, which is hereby incorporated by reference herein in its entirety.

What is claimed is:

1. An image processing apparatus comprising:
a tone correction unit configured to perform a predetermined tone correction process in a part of a luminance range of an image obtained as a result of photographing;
a contour correction unit configured to perform a contour correction process that corrects a contour of an object in the image; and
a control unit configured to control the contour correction unit to perform a first contour correction process in a first part of the luminance range where the tone correction unit does not perform the predetermined tone correction process in the image, and to perform a second contour correction process, which is lower in a degree of correction than the first contour correction process, in a second part of the luminance range where the tone correction unit performs the predetermined tone correction process in the image.

2. The image processing apparatus according to claim 1, wherein the second part of the luminance range has a luminance value less than a predetermined luminance value, and
wherein the control unit sets up a parameter for the second contour correction process based on a contour correction characteristic that defines a relation between a contour correction gain used when a contour of the object in the image is corrected and a luminance value of the image.

3. The image processing apparatus according to claim 2, wherein the control unit further sets up a suppressed level which indicates how much lower, compared with that of the first contour correction process, the degree of correction performed during the second contour correction process is and a luminance value from which reduction of a suppressed level starts in the second part of the luminance range.

4. The image processing apparatus according to claim 3, wherein the control unit sets up the luminance value from which reduction of the suppressed level starts according to the first part of the luminance range.

5. The image processing apparatus according to claim 3, wherein the control unit gradually increases the suppressed level as the luminance value increases in the second part of the luminance range to the contour correction gain used in the first part of the luminance range.

6. The image processing apparatus according to claim 1, further comprising:
an analysis unit configured to find a histogram that defines a relation between a luminance value and its frequency about the image, and to analyze the histogram concerned to obtain an analysis result about luminance distribution in the image, and
a determination unit configured to determine an intensity of the tone correction process according to the analysis result.

7. The image processing apparatus according to claim 6, wherein the analysis unit finds a low-luminance ratio that is a ratio of a low luminance area of which a luminance value is less than a predetermined first luminance threshold as the analysis result, and
wherein the determination unit determines the intensity of the tone correction process according to the low-luminance ratio.

8. The image processing apparatus according to claim 6, further comprising an exposure control unit configured to control exposure at a time of obtaining the image according to the analysis result,
wherein the analysis unit finds a first ratio of a low luminance area in which luminance is less than a predetermined first luminance threshold in the image, finds a second ratio of a high luminance area in which luminance is equal to or more than a second luminance threshold that is equal to or more than the first luminance threshold in the image, and obtains an evaluation value that evaluates luminance distribution in the image according to the first ratio and the second ratio as the analysis result.

9. The image processing apparatus according to claim 1, wherein the tone correction unit performs the tone correction process and then, the contour correction unit performs the contour correction process.

10. The image processing apparatus according to claim 1, wherein the contour correction unit performs the contour correction process and then, the tone correction unit performs the tone correction process.

11. An image pickup apparatus comprising:
an image pickup unit configured to photograph an object to obtain an image;
a tone correction unit configured to perform a predetermined tone correction process in a part of a luminance range of the image obtained by the image pickup unit;
a contour correction unit configured to perform a contour correction process that corrects a contour of an object in the image; and
a control unit configured to control the contour correction unit to perform a first contour correction process in a first part of the luminance range where the tone correction unit does not perform the predetermined tone correction process in the image, and to perform a second contour correction process, which is lower in a degree of correction than the first contour correction process, in a second part of the luminance range where the tone correction unit performs the predetermined tone correction process in the image.

12. A control method for an image processing apparatus, the control method comprising:
performing a predetermined tone correction process in a part of a luminance range of an image obtained as a result of photographing; and
performing a contour correction process that corrects a contour of an object in the image,
wherein performing the contour correction process that corrects the contour of the object in the image includes performing a first contour correction process in a first part of the luminance range where the predetermined tone correction process is not performed in the image, and performing a second contour correction process, which is lower in a degree of correction than the first contour correction process, in a second part of the luminance range where the predetermined tone correction process is performed in the image.

13. A non-transitory computer-readable storage medium storing a control program causing a computer to execute a control method for an image processing apparatus, the control method comprising:
performing a predetermined tone correction process in a part of a luminance range of an image obtained as a result of photographing; and
performing a contour correction process that corrects a contour of an object in the image,
wherein performing the contour correction process that corrects the contour of the object in the image includes performing a first contour correction process in a first part of the luminance range where the predetermined tone correction process is not performed in the image, and performing a second contour correction process, which is lower in a degree of correction than the first contour correction process, in a second part of the luminance range where the predetermined tone correction process is performed in the image.

14. An image processing apparatus comprising:
at least one processor or circuit configured to perform the operations of the following units:
a tone correction unit configured to perform a predetermined tone correction process in a part of a luminance range of an image obtained as a result of photographing;
a contour correction unit configured to perform a contour correction process that corrects a contour of an object in the image; and
a control unit configured to control the contour correction unit to perform a first contour correction process in a first part of the luminance range where the tone correction unit does not perform the predetermined tone correction process in the image, and to perform a second contour correction process, which is lower in a degree of correction than the first contour correction process, in a second part of the luminance range where the tone correction unit performs the predetermined tone correction process in the image.

15. The image processing apparatus according to claim 14, wherein the second part of the luminance range has a luminance value less than a predetermined luminance value, and
wherein the control unit sets up a parameter for the second contour correction process based on a contour correction characteristic that defines a relation between a contour correction gain used when a contour of the object in the image is corrected and a luminance value of the image.

16. The image processing apparatus according to claim 15, wherein the control unit further sets up a suppressed level which indicates how much lower, compared with that of the first contour correction process, the degree of correction performed during the second contour correction process is and a luminance value from which reduction of a suppressed level starts in the second part of the luminance range.

17. The image processing apparatus according to claim 16, wherein the control unit sets up the luminance value from which reduction of the suppressed level starts according to the first part of the luminance range.

18. The image processing apparatus according to claim 16, wherein the control unit gradually increases the suppressed level as the luminance value increases in the second part of the luminance range to the contour correction gain used in the first part of the luminance range.

19. The image processing apparatus according to claim 14, wherein the at least one processor or circuit is further configured to perform the operations of the following units:
   an analysis unit configured to find a histogram that defines a relation between a luminance value and its frequency about the image, and to analyze the histogram concerned to obtain an analysis result about luminance distribution in the image, and
   a determination unit configured to determine an intensity of the tone correction process according to the analysis result.

20. The image processing apparatus according to claim 19, wherein the analysis unit finds a low-luminance ratio that is a ratio of a low luminance area of which a luminance value is less than a predetermined first luminance threshold as the analysis result, and
   wherein the determination unit determines the intensity of the tone correction process according to the low-luminance ratio.

21. The image processing apparatus according to claim 19, wherein the at least one processor or circuit is further configured to perform the operations of an exposure control unit, the exposure control unit being configured to control exposure at a time of obtaining the image according to the analysis result,
   wherein the analysis unit finds a first ratio of a low luminance area in which luminance is less than a predetermined first luminance threshold in the image, finds a second ratio of a high luminance area in which luminance is equal to or more than a second luminance threshold that is equal to or more than the first luminance threshold in the image, and obtains an evaluation value that evaluates luminance distribution in the image according to the first ratio and the second ratio as the analysis result.

22. The image processing apparatus according to claim 14, wherein the tone correction unit performs the tone correction process and then, the contour correction unit performs the contour correction process.

23. The image processing apparatus according to claim 14, wherein the contour correction unit performs the contour correction process and then, the tone correction unit performs the tone correction process.

24. An image pickup apparatus comprising:
   at least one processor or circuit configured to perform the operations of the following units:
   an image pickup unit configured to photograph an object to obtain an image;
   a tone correction unit configured to perform a predetermined tone correction process in a part of a luminance range of the image obtained by the image pickup unit;
   a contour correction unit configured to perform a contour correction process that corrects a contour of an object in the image; and
   a control unit configured to control the contour correction unit to perform a first contour correction process in a first part of the luminance range where the tone correction unit does not perform the predetermined tone correction process in the image, and to perform a second contour correction process, which is lower in a degree of correction than the first contour correction process, in a second part of the luminance range where the tone correction unit performs the predetermined tone correction process in the image.

* * * * *